Dec. 8, 1931.   C. H. WATSON   1,835,104
AUTOMATIC WEIGHING DEVICE
Filed Aug. 5, 1930   2 Sheets-Sheet 1

INVENTOR
Coleman H. Watson
BY
ATTORNEYS

Dec. 8, 1931. C. H. WATSON 1,835,104
AUTOMATIC WEIGHING DEVICE
Filed Aug. 5, 1930  2 Sheets-Sheet 2
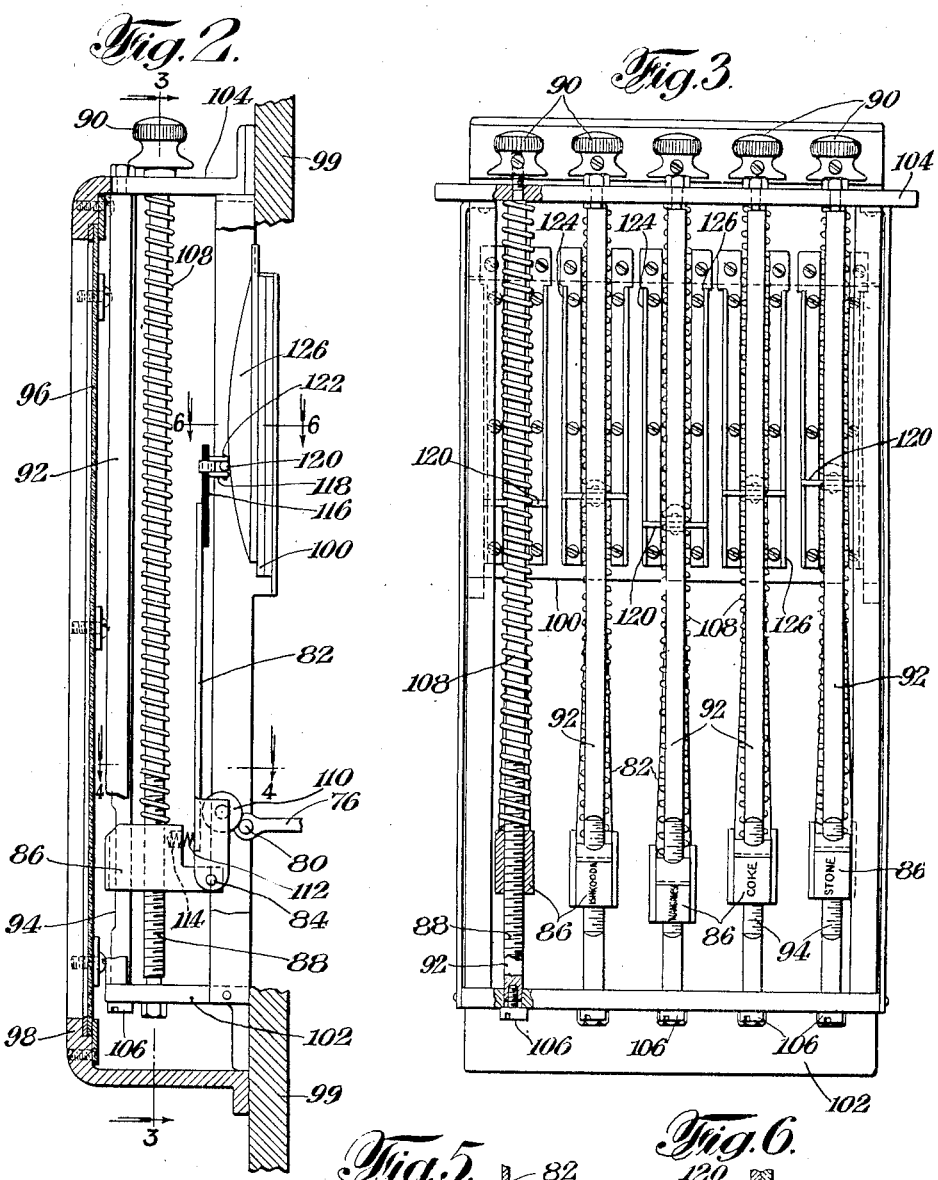
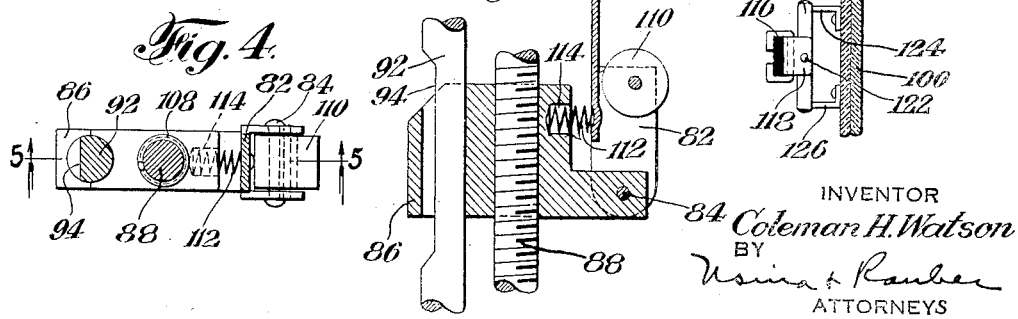
INVENTOR
Coleman H. Watson
BY
ATTORNEYS Patented Dec. 8, 1931

1,835,104

UNITED STATES PATENT OFFICE

COLEMAN H. WATSON, OF ENSLEY, ALABAMA

AUTOMATIC WEIGHING DEVICE

Application filed August 5, 1930. Serial No. 473,168.

This invention relates to improvements in weighing the burden to be charged to blast furnaces and aims to provide means for automatically cutting off the supply of material fed to a scale after the delivery of a predetermined quantity. In the embodiment of the invention shown, a plurality of storage hoppers discharge the burden material to suitable motor controlled conveyors or feeding devices all of which empty into a car supported on a scale platform. This car is adapted to be shifted so as to alternately discharge its burden into one of two skips of the usual type which travel to the top of the blast furnace and dump the burden therein. The motors for driving the several conveyors or feeders are controlled by scale actuated means which are effective to stop any individual motor automatically upon delivery of a predetermined weight of material to the scale by a given conveyor. Means are also provided whereby any motor can be manually controlled.

The invention will be fully apparent from the following specification when read in connection with the accompanying drawings and features of novelty will be defined with particularity in the appended claims.

In the drawings:—

Fig. 2 is a vertical longitudinal section through a scale actuated switch member adapted to coact with a conveyor motor control circuit;

Fig. 3 is a section on line 3—3 of Fig. 2;

Fig. 4 is an enlarged horizontal section on line 4—4 of Fig. 2;

Fig. 5 is a detail view illustrating a pivotal mounting for one of the switch members;

Fig. 6 is a section on line 6—6 of Fig. 2 on an enlarged scale.

Figure 1:
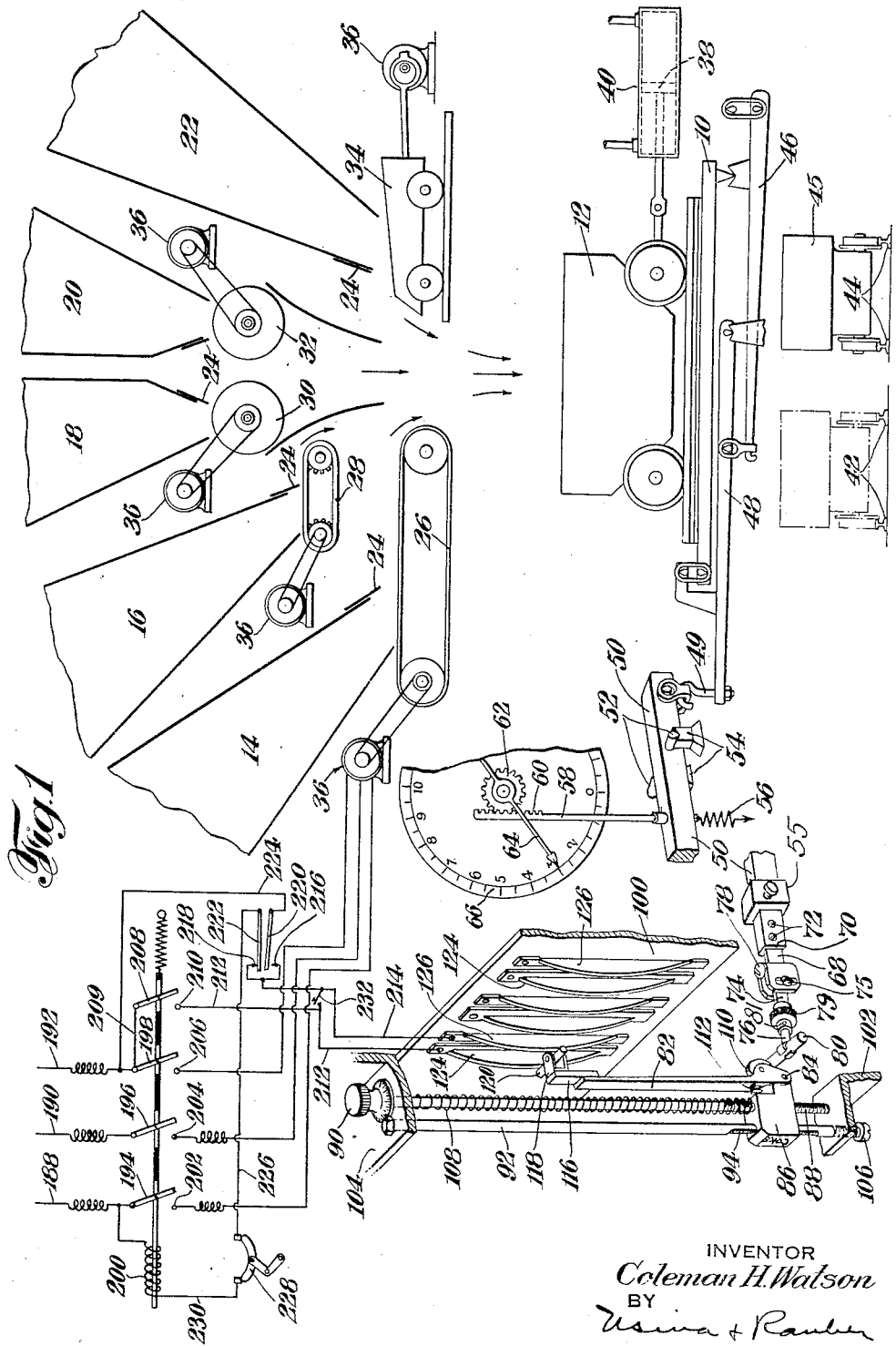
Fig. 1 is a schematic diagram illustrative of one embodiment of the invention.

Referring in detail to the drawings, 10 represents a scale platform having a car 12 mounted thereon which is adapted to receive blast furnace burden material from any one of a plurality of hoppers 14, 16, 18, 20 or 22. These hoppers in one installation are adapted to contain, respectively, coke, limestone, Ishkooda iron ore, Muscoda iron ore and manganese ore. The several hoppers are provided with suitable sliding doors or gates 24 which control the rate of feed therefrom. Hoppers 14 and 16 discharge their burden to conveyors 26 and 28. The hoppers 18 and 20 discharge their burdens to rotary feeders 30 and 32. Hopper 22 discharges its manganese ore to a shaking feeder 34. The several conveyors and feeders are independently driven by individual motors 36.

Each motor 36 is adaptd to be stopped automatically after its corresponding conveyor or feeder has discharged a predetermined amount of material into the scale car 12. The car 12 receives its respective loads successively from the several conveyors or feeders.

The scale car when receiving material from the various conveyors or feeders is located in the central position as illustrated in Fig. 1. After having accumulated a charge, it is shifted alternately to the right and left by means of an air actuated piston 38 operating in a suitable cylinder 40. The burden is discharged alternately in usual skip cars traveling to the top of a blast furnace on parallel tracks 42 and 44, these cars being indicated diagrammatically at 45.

The scale platform 10 is supported by a plurality of scale members 46 and 48 which are connected by a link 49 with the scale beam or scale operating element 50. This scale beam or element includes a knife-edge 52 which rests in V-seats 54 carried by any suitable fixed support. An adjustable counterweight 55 provides a balance for the scale parts and the weight of the burden material is supported by the scale platform 10, being opposed by scale spring 56. The scale platform and the various scale or weighing machine elements may be of any suitable or approved construction and in themselves form no part of the present invention and are therefore merely diagrammatically illustrated. The scale beam, as shown in Fig. 1, is connected by means of a link 58 with a rack 60 meshing with a pinion 62 which carries a pointer 64 operating over a suitably calibrated indicator dial 66.

At its outer end, the scale operated element has an extension 68 rigidly mounted in a slot 70 and held in position by set screws 72. This extension carries an adjustably mounted shank 74 adapted to be adjusted in vertical position by means of screw 78. Clamp screw 75 is provided to tighten shank 74 in position after correct vertical adjustment is made. The shank supports a stem 76 which is adapted to be adjusted longitudinally and held in its adjusted position by means of a knurled nut 79. A set screw 81 is provided to hold stem 76 in place after the adjustment in a longitudinal direction is made.

At its outer end, the stem 76 carries a transversely extending bar 80 which is adapted to coact with a plurality of switch members. The adjustments heretofore mentioned for extension 68, shank 74 and stem 76 are provided to effect a fine adjustment both vertical and horizontal of bar 80 relative to switch members, so that the said members will operate to stop the flow of materials into car 12 exactly as indicated on dial. Each switch member, indicated as a whole at 82, is adapted to control a corresponding motor, driving a conveyor or similar feeding device which discharges into the receiving car 12 supported on the scale.

The switch members are preferably mounted on supports which can be adjusted relatively to the scale operated member so that the various switch members can be actuated after a predetermined amount of material from its corresponding conveyor has been discharged to the car supported on the scale platform.

Each switch member 82 is pivoted at 84 to a support 86 which is adapted to be adjusted by a feed screw 88 by manipulation of a micrometer knob 90. The support 86 is guided by a rod 92 which is provided on one face with calibrations 94 which can be observed through a window 96 of a suitable casing 98 within which the switch members and related elements are enclosed. This casing is secured to a base 99 which carries lower and upper brackets 102 and 104 which support the lead screw 88 and the guide rod 92. The guide rod 92 is seated at its lower end on an adjustment screw 106 in order to effect an initial accurate zero adjustment of the parts.

To prevent lost motion or to take-up backlash between the lead screw 88 and the adjustable support 86, I provide a spring 108 which surrounds the lead screw, the upper end of which engages the under side of the bracket 104, the lower end of which bears against the top face of the support 86. This spring also serves to keep lead screw 88 seated on its pivot support.

Each switch member 82 carries an antifriction roller 110 which is adapted to be engaged by the rod 80 carried by the scale operated element 50. A spring 112 is interposed between one face of the switch member 82 and a suitable spring seat 114 formed in the support 86.

At its upper end, the switch member 82 carries a strip of insulation 116 to which is secured a bracket 118 having a contact arm 120 swiveled thereto on a pin 122.

Normally the contact arm 120 completes a circuit across a pair of contacts 124 and 126 which are supported by an insulating base panel 100. The contacts 124 and 126, as clearly shown, are curved and the radius of this curve is determined by the length of the scale operated element.

With the arrangement described, it will be apparent that by adjusting the supports 86 to different vertical positions the bar 80 carried by the scale actuated element can be caused to break the circuit across the contacts 124 and 126 at any predetermined position of the scale beam. It follows, therefore, that the circuit can be broken after any predetermined weight of material has been discharged by a conveyor, whose motor circuit is controlled by a given pair of contacts 124 and 126 and a given contact arm 120.

For convenience in identification, the supports 86 will be marked to identify the particular material whose feed to the scale is controlled by the switch element carried thereby. For example, the support 86 and switch member 82 shown in Fig. 1 is assumed to control the feed of coke from the hopper 14 to the scale, therefore, the support 86 has the word "coke" inscribed thereon, which can be observed through the glass in the casing. It will be understood that by manipulating the micrometer knob 90 and by reading the calibrations on the guide rod 94 the support can be so set that when a predetermined quantity of coke has been discharged by the conveyor into the car carried by the scale that the control circuit for the coke conveyor motor can be automatically broken and motor stopped. Similar adjustment of the various supports 86 can be made so that material which falls from any conveyor can be similarly stopped upon the delivery of a predetermined quantity of such material, it being understood that the single bar 80 carried by the scale operated element coacts with a plurality of switch members 82, each of which is capable of controlling a conveyor or feeder.

The control apparatus for each individual motor 36 driving the respective conveyors and feeders 26, 28, 30, 32 and 34 as diagrammatically illustrated in Fig. 1 comprises a control circuit having manually operable switches therein, an operating coil controlling a main contactor and a holding-in contactor. The main contactor controls the supply of current from the feed wires to the conveyor driving motors.

Feed wires 188, 190 and 192 are adapted to be connected in circuit with wires 202, 204 and 206 when an operating coil 200 in the control circuit is energized. Upon energization of this coil, the contact members 194, 196 and 198 will close the motor circuit across contacts 202, 204, 206 and thereby cause the motor 36 to drive the conveyor connected therewith.

A control circuit sustaining contactor 208 is connected by wire 209 with one of the main feed wires 192. This sustaining contactor is arranged to be actuated by the operating coil 200 which operates the main contactors 194, 196 and 198. The sustaining contactor is adapted to close a circuit from the feed wire 192 across contact 210 to a wire 212 which is connected to one of the contact bars 124 which cooperates with the scale actuated switch member 82. The other contact bar 126 is connected by wire 214 with contacts 216 and 218 which cooperate respectively with manually operable starting and stopping switch buttons 220 and 222. The starting switch 220 is connected by a wire 224 with one of the main supply lines 192 as shown. The stop switch button 222 is connected by wire 226 with an overload relay 228, which in turn is connected by wire 230 with the contactor operating coil 200.

A manually operable snap switch 232 is interposed between the wires 212 and 214 so that if desired the contact bars 124 and 126 can be short circuited so as to render the scale operated circuit closing mechanism non-operative and thereby permit the motors to be started and stopped manually by operation of the push button switches 220 or 222.

In normal operation, the snap switch 232 will be open and thereby the motors will be under control of the scale operated switch member 82. In operation, in order to set the apparatus in condition for automatically controlling the supply of material fed by the various conveyors, the operator will first press the starting button 220. This will momentarily close the circuit from wire 192 through wire 224, switch 220, contact 216, contact 218 through normally closed switch 222, wire 226 through overload relay 228 through operating coil 200 thereby energizing this coil and closing main contactors 194, 196 and 198 and also the sustaining contactor 208. Closing of the latter will sustain the circuit from feed wire 192 through wires 209 and 210, contactor 208 and wire 212 leading to contact bar 124. The circuit will be closed through the contact arm 120 of the switch operated member 82 through contact bar 126, wire 214 which connects with the wire 226 through stop button switch contact 218. This circuit will be maintained so long as the contact arm 120 remains in engagement with the contact bars 124 and 126. Clearly when a predetermined amount of material is fed to the scale by a given conveyor the scale operated element 50 will engage the roller 110 and rock the switch member 82, thus breaking the circuit across contact bars 124 and 126.

The operating coil 200 will be deenergized whereupon the main contactors 194, 196 and 198 will open and break the motor circuit. At the same time, the sustaining contactor 208 will be opened. Thus the parts will be restored to starting position. When the contents of the scale car are emptied, it will be understood that the contact arm 120 will be moved into engagement with the contact bars 124 and 126, by the spring 112, and the automatic weighing operation may be repeated when the operator again actuates the starting button 220.

In the event that it is desired to charge materials to the car 12 on the scale platform under manual control, that is without having the scale actuated switch member 82 come into play to automatically interrupt the feed at the predetermined point, the operator will close the snap switch 232. This will short circuit the contact bars 124 and 126. With these bars so short circuited, the operator will press the starting button 220 and thus energize the operating coil 200 and close the main contactor and also the sustaining contactor. In order to stop the motor, the circuit through the operating coil 200 will be manually broken by the operator opening the stop switch button 222. Such manual operation may be desirable at times in order to boost the charge of certain burden materials fed to the furnace to meet particular conditions without the necessity of disturbing the adjustments of the scale actuated switch member 82. It is understood, however, that a small amount of weight may be added to the burden even while the automatic cut off feature is in operation and the roller 110 has already been tripped by rod 80, this being accomplished without closing snap switch 232, by simply holding in start button until desired weight is obtained and then releasing it and pushing stop button.

While I have described with great particularity the details of the specific embodiment of the invention illustrated it is not to be construed that I am limited thereto since changes in arrangement and substitution of equivalents may be made by those skilled in the art without departing from the invention as defined in the appended claims.

What I claim is:—

1. An apparatus of the character described comprising a plurality of conveyors, motors for driving them, a scale adapted to receive material from the conveyors, separate circuits for said motors, separate scale actuated means controlling the respective motor circuits, and a single member actuated by the scale common to a plurality of said scale actuated means.

2. An apparatus of the class described comprising a conveyor, a motor for driving the latter, a scale adapted to receive material from the conveyor, a power supply circuit for said motor, a contactor controlling said circuit, a control circuit having an operating coil therein for actuating said contactor, and means actuated by the scale controlling the flow of current through said control circuit.

3. An apparatus of the class described comprising a conveyor, a motor for driving the latter, a scale adapted to receive material from the conveyor, a power supply circuit for said motor, a contactor controlling said circuit, a control circuit having an operating coil therein for actuating said contactor, a sustaining contactor and stop and start control switches in said control circuit and a scale operated means adapted to break said control circuit upon delivery to the scale by said conveyor of a predetermined weight of material.

4. An apparatus of the class described comprising a conveyor, a motor for driving the latter, a scale adapted to receive material from the conveyor, a power supply circuit for said motor, a contactor controlling said circuit, a control circuit having an operating coil therein for actuating said contactor, a sustaining contactor and stop and start control switches in said control circuit and a scale operated means adapted to break said control circuit and means for short circuiting said scale operated means.

5. An apparatus of the class described comprising a scale beam, a plurality of scale actuated switch members, a bar secured to the scale beam and adapted to coact with said switch members, and means for adjustably supporting said switch members so that they may come into coaction with said bar at predetermined intervals.

6. An apparatus of the class described comprising a scale beam, a plurality of scale actuated switch members, a bar secured to the scale beam and adapted to coact with said switch members, and means for adjustably supporting said switch members so that they may come into coaction with said bar at predetermined intervals, and a plurality of motor-driven devices for feeding materials to said scale, each device being under control of one of said scale actuated switch members.

7. An apparatus of the class described comprising a scale operated element, a plurality of switch members, a bar carried by said element adapted to actuate any of said switch members, supports to which the switch members are pivoted, feed screws for varying the relative positions of said supports, and guides coacting with the supports.

8. An apparatus of the class described comprising a scale operated element, a plurality of switch members, a bar carried by said element adapted to actuate any of said switch members, supports to which the switch members are pivoted, feed screws for varying the relative positions of said supports, calibrated guide rods coacting with said supports and means for effecting a zero adjustment of said rods.

9. An apparatus of the class described comprising a scale operated element, an adjustably mounted support, a switch member pivoted thereto, an anti-friction roller carried by the latter adapted to coact with said element to move the switch member.

10. An apparatus of the class described comprising a scale operated element, an adjustably mounted support, a switch member pivoted thereto, an anti-friction roller carried by the latter adapted to coact with said element to move the switch member, a pair of contact bars, and a contact arm coacting therewith swivelled on said switch member.

11. An apparatus of the class described comprising a scale operated element, an adjustably mounted support having a switch member pivoted thereto and adapted to be oscillated upon predetermined movement of said element, a pair of spaced contact bars insulated from each other and means carried by said switch member adapted to normally close a circuit across said contact bars and to open said circuit when said member is oscillated.

In witness whereof, I have hereunto signed my name.

COLEMAN H. WATSON.